United States Patent
Fernandez et al.

(10) Patent No.: US 8,299,783 B2
(45) Date of Patent: Oct. 30, 2012

(54) CIRCUITS AND METHODS FOR CALIBRATION OF A MOTION DETECTOR

(75) Inventors: Devon Fernandez, Londonderry, NH (US); Glenn A. Forrest, Bow, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 611 days.

(21) Appl. No.: 12/548,738

(22) Filed: Aug. 27, 2009

(65) Prior Publication Data

US 2011/0048102 A1    Mar. 3, 2011

(51) Int. Cl.
  *G01B 7/30* (2006.01)
  *G01R 33/00* (2006.01)
(52) U.S. Cl. .................. 324/207.25; 324/225; 324/202; 324/207.12
(58) Field of Classification Search ............. 324/207.25, 324/225, 202, 207.12
  See application file for complete search history.

(56) References Cited

U.S. PATENT DOCUMENTS

| | | |
|---|---|---|
| 5,264,783 A | 11/1993 | Vig et al. |
| 5,389,889 A | 2/1995 | Towne et al. |
| 5,442,283 A | 8/1995 | Vig et al. |
| 5,517,112 A | 5/1996 | Vig et al. |
| 5,581,179 A | 12/1996 | Engel et al. |
| 5,619,137 A | 4/1997 | Vig et al. |
| 5,621,319 A | 4/1997 | Bilotti et al. |
| 5,650,719 A | 7/1997 | Moody et al. |
| 5,686,894 A | 11/1997 | Vig et al. |
| 5,694,038 A | 12/1997 | Moody et al. |
| 5,729,130 A | 3/1998 | Moody et al. |
| 5,917,320 A | 6/1999 | Scheller et al. |
| 6,091,239 A | 7/2000 | Vig et al. |
| 6,100,680 A | 8/2000 | Vig et al. |
| 6,232,768 B1 | 5/2001 | Moody et al. |
| 6,242,908 B1 | 6/2001 | Scheller et al. |
| 6,265,865 B1 | 7/2001 | Engel et al. |
| 6,297,627 B1 | 10/2001 | Towne et al. |
| 6,525,531 B2 | 2/2003 | Forrest et al. |
| 6,690,155 B2 | 2/2004 | Vig et al. |
| 6,693,419 B2 | 2/2004 | Stauth et al. |
| 6,919,720 B2 | 7/2005 | Vig et al. |
| 7,046,000 B1 | 5/2006 | Hara et al. |
| 7,053,674 B1 | 5/2006 | Romero et al. |
| 7,138,793 B1 | 11/2006 | Bailey |
| 7,199,579 B2 | 4/2007 | Scheller et al. |
| 7,253,614 B2 | 8/2007 | Forrest et al. |
| 7,365,530 B2 | 4/2008 | Bailey et al. |
| 7,368,904 B2 | 5/2008 | Scheller et al. |
| 2009/0001972 A1 | 1/2009 | Fernandez et al. |

OTHER PUBLICATIONS

PCT International Preliminary Report on Patentability and Written Opinion of the ISA dated Mar. 8, 2012; for PCT Pat. App. No. PCT/US2010/045690; 9 pages.
PCT Search Report and Written Opinion of the ISA dated Nov. 24, 2010 for PCT/US2010/045690.
Allegro Microsystems, Inc. internal document ATS657; "Dynamic, Self-Calibrating, Threshold-Detecting, Differential Speed and Direction Hall-Effect Gear Tooth Sensor IC;" Feb. 6, 2009; 15 sheets.
Allegro Microsystems Inc. internal document ATS667LSG; "True Zero-Speed, High Accuracy Gear Tooth Sensor IC;" Mar. 26, 2009; 14 sheets.

*Primary Examiner* — Reena Aurora
(74) *Attorney, Agent, or Firm* — Daly, Crowley, Mofford & Durkee, LLP

(57) ABSTRACT

A circuit to detect a movement of an object has a calibration time period that ends when peak detectors in the circuit stop updating for a predetermined amount of time. A method associated with the circuit is also described.

25 Claims, 9 Drawing Sheets

CIRCUITS AND METHODS FOR CALIBRATION OF A MOTION DETECTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to integrated circuits and, more particularly, to integrated circuits for detecting a movement or a rotation of a ferromagnetic object.

BACKGROUND OF THE INVENTION

Magnetic field sensors (e.g., rotation detectors) for detecting ferromagnetic articles and/or magnetic articles are known. The magnetic field associated with the ferromagnetic article or magnetic article is detected by a magnetic field sensing element, such as a Hall element or a magnetoresistance element, which provides a signal (i.e., a magnetic field signal) proportional to a detected magnetic field. In some arrangements, the magnetic field signal is an electrical signal.

The magnetic field sensor processes the magnetic field signal to generate an output signal that changes state each time the magnetic field signal crosses thresholds, either near to peaks (positive and/or negative peaks) or near to some other level, for example, zero crossings of the magnetic field signal. Therefore, the output signal has an edge rate or period indicative of a speed of rotation of the ferromagnetic or magnetic object, for example, a gear or a ring magnet.

One application for a magnetic field sensor is to detect the approach and retreat of each tooth of a rotating ferromagnetic gear, either a hard magnetic gear or a soft ferromagnetic gear. In some particular arrangements, a ring magnet having magnetic regions (permanent or hard magnetic material) with alternating polarity is coupled to the ferromagnetic gear or is used by itself and the magnetic field sensor is responsive to approach and retreat of the magnetic regions of the ring magnet. In other arrangements, a gear is disposed proximate to a stationary magnet and the magnetic field sensor is responsive to perturbations of a magnetic field as the gear rotates.

In one type of magnetic field sensor, sometimes referred to as a peak-to-peak percentage detector (or threshold detector), one or more threshold levels are equal to respective percentages of the peak-to-peak magnetic field signal. One such peak-to-peak percentage detector is described in U.S. Pat. No. 5,917,320 entitled "Detection of Passing Magnetic Articles While Periodically Adapting Detection Threshold" and assigned to the assignee of the present invention.

Another type of magnetic field sensor, sometimes referred to as a slope-activated detector (or peak-referenced detector, or peak detector for short), is described in U.S. Pat. No. 6,091,239 entitled "Detection Of Passing Magnetic. Articles With a Peak Referenced Threshold Detector," also assigned to the assignee of the present invention. In the peak-referenced magnetic field sensor, the threshold signal differs from the positive and negative peaks (i.e., the peaks and valleys) of the magnetic field signal by a predetermined amount. Thus, in this type of magnetic field sensor, the output signal changes state when the magnetic field signal comes away from a peak or valley of the magnetic field signal by the predetermined amount.

It should be understood that, because the above-described threshold detector and the above-described peak detector both have circuitry that can identify the positive and negative peaks of a magnetic field signal, the threshold detector and the peak detector both include a circuit portion referred to as a "peak identifier" herein, which is configured to detect positive peaks and/or negative peaks of the magnetic field signal. The threshold detector and the peak detector, however, each use the detected peaks in different ways.

In order to accurately detect the positive and negative peaks of a magnetic field signal, the rotation detector is capable of tracking at least part of the magnetic field signal. To this end, typically, one or more digital-to-analog converters (DACs) can be used to generate a tracking signal, which tracks the magnetic field signal. For example, in the above-referenced U.S. Pat. Nos. 5,917,320 and 6,091,239, two DACs are used, one (PDAC) to detect the positive peaks of the magnetic field signal and the other (NDAC) to detect the negative peaks of the magnetic field signal.

Some types of rotation detectors perform one or more types of initialization or calibration, for example, at a time near to start up or power up of the rotation detector, or otherwise, from time to time as desired. During one type of calibration, the above-described threshold level is determined. In some types of calibration, a time interval during which the calibration occurs is determined in accordance with a predetermined number of cycles of the magnetic field signal. Thus, for fast magnetic field signals (e.g., for fast rotating gears), the time available for calibration is small. In those applications for which the movement or rotation is rapid and the time available for calibration is small, the rotation detector might not calibrate properly, i.e., the threshold might not be properly determined.

It would, therefore, be desirable to provide a magnetic field sensor that can accurately identify a threshold level associated with a magnetic field signal, accurate for both fast and slow magnetic field signals.

SUMMARY OF THE INVENTION

The present invention provides a magnetic field sensor that can accurately identify a threshold level associated with a magnetic field signal, accurate for both fast and slow magnetic field signals In accordance with one aspect of the present invention, a circuit for detecting a movement of an object includes at least one magnetic field sensing element for generating a DIFF signal proportional to a magnetic field associated with the object. The circuit also includes at least one motion detector coupled to receive the DIFF signal and configured to generate a tracking signal to track the DIFF signal so as to move toward a peak of the DIFF signal. The at least one motion detector includes a PDAC configured to generate a PDAC output signal to track the DIFF signal during a PDAC update time interval within a calibration time period and to hold the DIFF signal at times outside of the PDAC update time interval within the calibration time period. The at least one motion detector also includes an NDAC configured to generate an NDAC output signal to track the DIFF signal during an NDAC update time interval within the calibration time period and to hold the DIFF signal at times outside of the NDAC update time interval within the calibration time period. The at least one motion detector also includes an update logic circuit coupled to the PDAC and to the NDAC, wherein the update logic circuit is configured to establish an end of the calibration time period by determining if a first time period since an end of the PDAC update time interval is greater than a first predetermined time threshold and by determining if a second time period since an end of the NDAC update time interval is greater than a second predetermined time threshold. In some embodiments, the first and second time thresholds can be the same predetermined time threshold.

In accordance with another aspect of the present invention, a method of detecting a movement of an object includes generating a DIFF signal with at least one magnetic field sensing element, wherein the DIFF signal is proportional to a magnetic field associated with the object. The method also includes generating a tracking signal to track the DIFF signal. The generating the tracking signal includes generating a PDAC output signal to track the DIFF signal during a PDAC update time interval within a calibration time period and to hold the DIFF signal at times outside of the PDAC update time interval within the calibration time period. The generating the tracking signal also includes generating an NDAC output signal to track the DIFF signal during an NDAC update time interval within the calibration time period and to hold the DIFF signal at times outside of the NDAC update time interval within the calibration time period. The generating the tracking signal also includes establishing an end of the calibration time period. The establishing includes determining if a first time period since an end of the PDAC update time interval is greater than a first predetermined time threshold, and determining if a second time period since an end of the NDAC update time interval is greater than a second predetermined time threshold. In some embodiments, the first and second time thresholds can be the same predetermined time threshold.

In accordance with another aspect of the present invention, a method of detecting a movement of an object includes generating a magnetic field signal with at least one magnetic field sensing element, wherein the magnetic field signal is proportional to a magnetic field associated with the object. The method also includes generating a tracking signal during a calibration mode of operation that moves toward a peak of the magnetic field signal at least until the peak is reached. The method also includes terminating the calibration mode of operation after a predetermined time interval has lapsed since the tracking signal reached the peak of the magnetic field signal.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
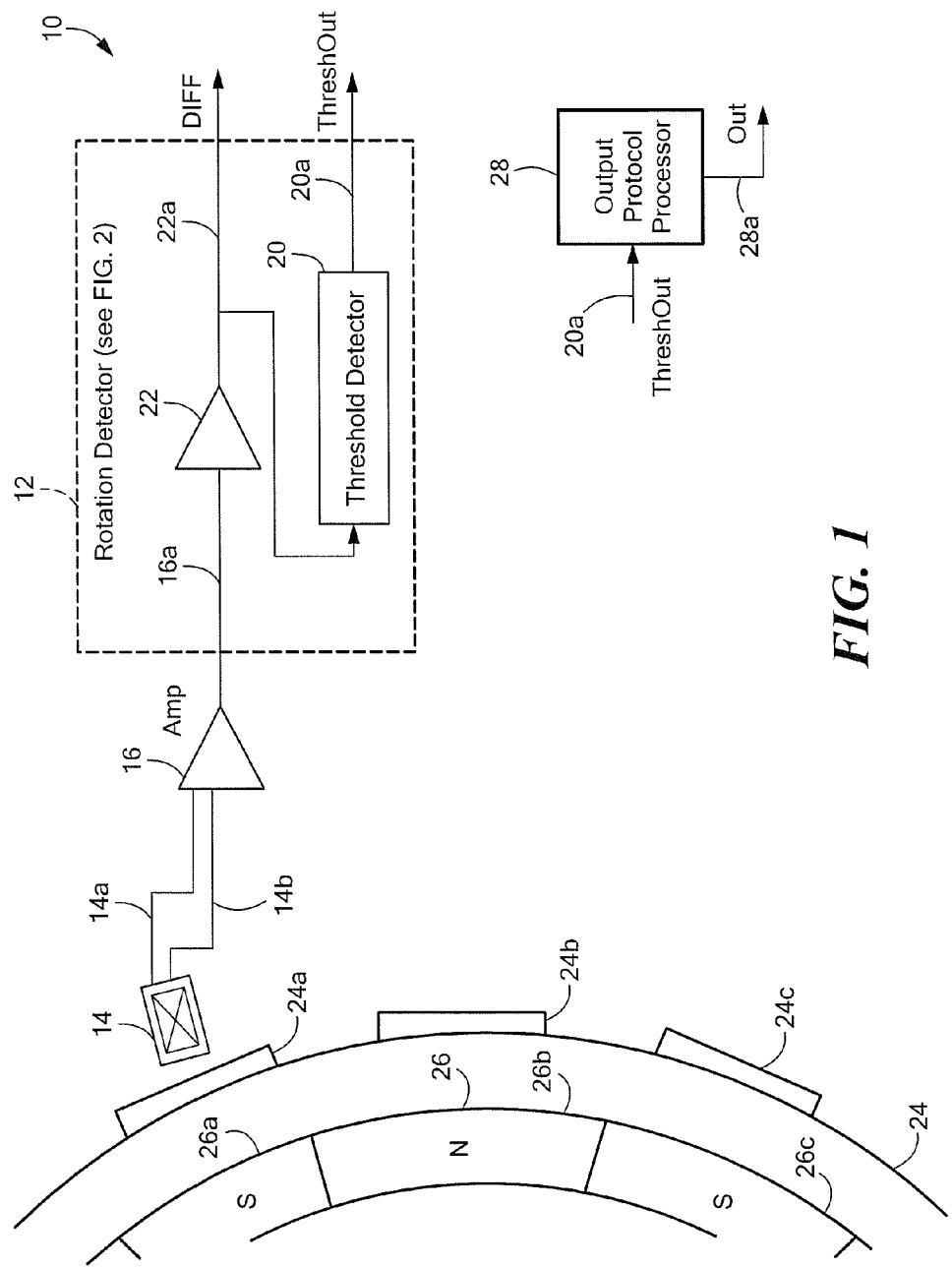
FIG. 1 is block diagram showing an exemplary magnetic field sensor in the form of a rotation sensor, having a rotation detector with a threshold detector.

Before describing the present invention, some introductory concepts and terminology are explained. As used herein, the term "magnetic field sensing element" is used to describe a variety of types of electronic elements that can sense a magnetic field. The magnetic field sensing elements can be, but are not limited to, Hall effect elements, magnetoresistance elements, or magnetotransistors. As is known, there are different types of Hall effect elements, for example, planar Hall elements, vertical Hall elements, circular Hall elements, and Indium antimonide (InSb) sensors. As is also known, there are different types of magnetoresistance elements, for example, anisotropic magnetoresistance (AMR) elements, giant magnetoresistance (GMR) elements, tunneling magnetoresistance (TMR) elements, and magnetic tunnel junction (MTJ) elements.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, most, but not all, types of magnetoresistance elements tend to have axes of maximum sensitivity parallel to the substrate and most, but not all, types of Hall elements tend to have axes of sensitivity perpendicular to a substrate.

As used herein, the term "magnetic field sensor" is used to describe a circuit that includes a magnetic field sensing element. Magnetic field sensors are used in a variety of applications, including, but not limited to, a current sensor that senses a magnetic field generated by a current carried by a current-carrying conductor, a magnetic switch or proximity detector that senses the proximity of a ferromagnetic or magnetic object, a rotation detector that senses passing ferromagnetic articles, for example, magnetic domains of a ring magnet or teeth of a ferromagnetic gear, and a magnetic field sensor that senses a magnetic field density of a magnetic field. Rotation detectors are used as examples herein. However, the circuits and techniques described herein apply also to any magnetic field sensor capable of detecting a motion of an object.

Threshold detectors and peak detectors are described above. As used herein, the term "peak identifier" is used to describe a circuit that can track and perhaps hold a signal representative of a positive peak or a negative peak (or both) of a magnetic field signal. It should be understood that both a threshold detector and a peak detector both employ a peak identifier circuit.

While circuits are shown below that use threshold detectors, in other embodiments, similar circuits can use peak detectors. Also, while circuits are shown below that use rotation detectors, in some embodiments, the rotations detectors can be motion detectors configured to detect other motions of an object, for example, repetitive linear motions.

Operation of a magnetic field sensor in a so-called "calibration mode," also referred to herein as an "initialization mode," is described herein. Reference is also made herein to operation of a magnetic field sensor in a so-called "running mode." The calibration mode can occur at the beginning of operation (or from time to time as desired) and the running mode is achieved at other times. Operation of the running mode is described in greater detail in one or more of the above-mentioned patents, notably, U.S. Pat. No. 5,917,320 and U.S. patent application Ser. No. 11/333,522, which are incorporated by reference herein in their entirety.

In general, during the calibration mode, an output signal from the magnetic field sensor may not be accurate, and during the running mode, the output signal is considered to be accurate, i.e., it has edges properly aligned with features of the magnetic field signal.

While a calibration time period is discussed herein, and end of which ends the calibration mode discussed herein in accordance with certain criteria, it should be recognized that other calibrations can be performed after the end of the indicated calibration time period. For example, an automatic gain control can continue calibrating after the end of the indicated calibration time period. At some point after the end of the indicated calibration time period, but not necessarily coincident with the end of the indicated calibration time period, the magnetic field sensors described herein can enter the running mode, during which updates to values of circuit parameters can update in a different way than during the calibration mode.

Referring now to FIG. 1, an exemplary magnetic field sensor 10 includes a magnetic field sensing element 14 for generating a signal 14a, 14b (i.e., a magnetic field signal) proportional to a magnetic field associated with an object 24. The magnetic field sensing element 14 can be, but is not limited to, a Hall effect element, a magnetoresistance element, or a magnetotransistor.

The object 24 can be an object configured to rotate, for example, a ferromagnetic gear. The magnetic field sensor 10 can include an amplifier 16 coupled to receive signals 14a, 14b from the magnetic field sensing element 14 and configured to generate a signal 16a (also a magnetic field signal).

In some embodiments, the magnetic field sensor 10 also includes a motion detector, here a rotation detector 12, having an amplifier 22 coupled to receive the signal 16a and configured to generate a signal 22a, also referred to herein as a DIFF signal, representative of the signal 16a (also a magnetic field signal). In some embodiments, the amplifier 22 is an automatic gain control (AGC) amplifier. The DIFF signal is also referred to herein as a magnetic field signal. Thus, the signals 14a, 14b, 16a, and 22a are all magnetic field signals, and are all indicative of a magnetic field experience by the magnetic field sensing element 14.

The rotation detector 12 can include a threshold detector 20 coupled to receive the DIFF signal 22a and configured to generate a ThreshOut motion signal 20a indicative of a movement (i.e., rotation) of the object 24. In some embodiments described more fully below, the motion signal 20a is a two state square wave having a frequency proportional to the speed of rotation of the object 24.

In some arrangements, the magnetic field sensing element 14 can be responsive to motion of the object 24, for example, motion of ferromagnetic gear teeth upon a gear, of which gear teeth 24a-24c upon a gear 24 are representative. To this end, a fixed magnet (not shown) can be disposed proximate to the magnetic field sensing element 14 and the gear teeth can disturb the magnetic field generated by the magnet as the gear rotates. However, in other arrangements, the magnetic field sensing element 14 can be responsive to movement of magnetic regions upon a magnet, for example, magnetic regions 26a-26c upon a ring magnet 26. In some particular arrangements, the ring magnet 26 and the gear 24 are coupled together with a shaft or the like. In these particular arrangements, the ring magnet 26 can be proximate to the magnetic field sensing element 14, but the gear 24 need not be proximate to the magnetic field sensing element 14.

The magnetic field sensing element 14 is responsive to proximity of the ring magnet 26 and, in particular, to proximity of passing magnetic regions north (N) and south (S) 26a-26c. In operation, the magnetic field sensing element 14 produces the magnetic field signal 14a, 14a (and also the magnetic field signals 16a, 22a) having a generally sinusoidal shape when the ring magnet 26 rotates, wherein each peak (positive and negative) of the sinusoid is associated with one of the magnetic regions N, S.

The magnetic field sensor 10 can also include an output protocol processor 28 coupled to receive the ThreshOut motion signal 20a and configured to generate an output signal 28a representative of the speed of rotation of the object 24. In some embodiments the output signal 28a is a two state square wave having a frequency proportional to the speed of rotation of the object 24. In other embodiments, the output signal 28a comprises digital words representative of the speed of rotation of the object 24.

Figure 1A:
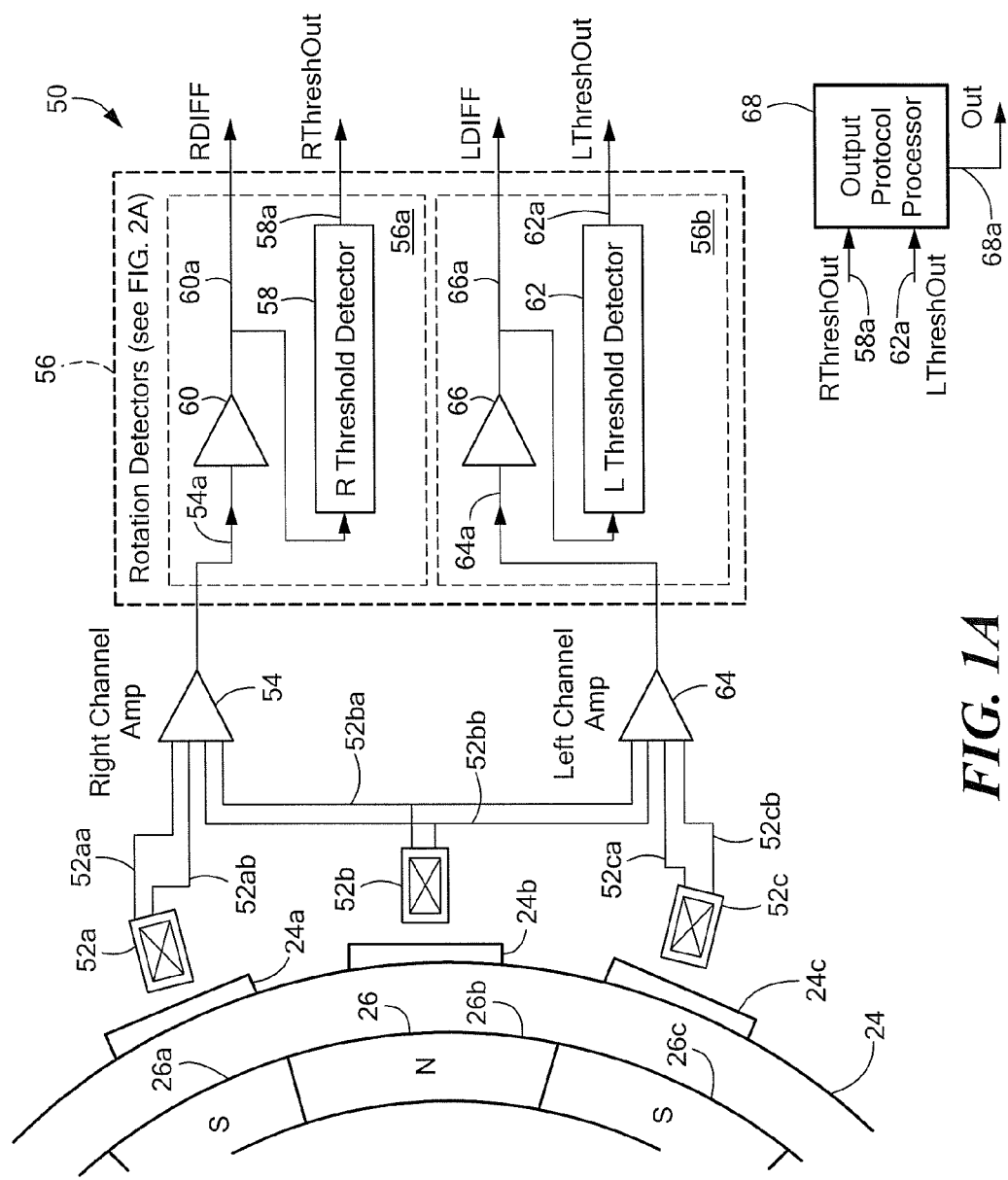
FIG. 1A is a block diagram showing another exemplary magnetic field sensor in the form of a rotation sensor, having two rotation detectors with a respective two threshold detectors.

Referring now to FIG. 1A, in which like elements of FIG. 1 are shown having like reference designations, another exemplary magnetic field sensor 50 includes a plurality of magnetic field sensing elements 52a-52c for generating signals 52aa, 52ab, 52ba, 53bb, 52ca, 52cb (magnetic field signals) proportional to a magnetic field.

The magnetic field sensor 50 includes a right channel amplifier 54 coupled to the magnetic field sensing elements 52a and 52b and configured to generate a signal 54a (also a magnetic field signal). The magnetic field sensor 50 also includes a left channel amplifier 64 coupled to the magnetic field sensing elements 52b and 52c and configured to generate a signal 64a (also a magnetic field signal). The signal 54a is proportional to a magnetic field at a first location relative to the object 24 and the signal 64a is proportional to a magnetic field at a second location relative to the object 24. As described more fully below, the first and second locations are associated with right and left electronic channels, respectively.

The magnetic field sensor 50 also includes a rotation detector 56, which includes right and left channel rotation detectors, here rotation detectors 56a, 56b, respectively. The rotation detector 56a can include an amplifier 60 coupled to receive the signal 54a and configured to generate an RDIFF signal 60a (also a magnetic field signal) representative of the signal 54a. The rotation detector 56b can include an amplifier 66 coupled to receive the signal 64a and configured to generate an LDIFF signal 66a (also a magnetic field signal) representative of the signal 64a. In some embodiments, the amplifiers 60, 66 are automatic gain control (AGC) amplifiers.

The rotation detector 56a also includes a right channel threshold detector 58 coupled to receive the RDIFF signal 60a and configured to generate an RThreshOut motion signal 58a indicative of a movement (i.e., rotation) of the object 24. The rotation detector 56b also includes a left channel threshold detector 62 coupled to receive the LDIFF signal 66a and configured to generate an LThreshOut motion signal 62a indicative of the movement (i.e., rotation) of the object 24.

In some embodiments, the motion signals 58a, 62a are each two state square waves having a frequency proportional to the speed of rotation of the object 24. It will be understood that, since the magnetic field sensing elements 52a-52c are at different physical locations, the RThreshOut signal 58a can have a different phase than the LThreshOut signal 62a. Furthermore, if the object 24 rotates in one direction, the phase of the RThreshOut signal 58a will lead the phase of the LThreshOut signal 62a, but if the object 24 rotates in the opposite direction, the phase relationship will reverse. Therefore, the magnetic field sensor 50, unlike the magnetic field sensor 10 of FIG. 1, is able to generate signals representative not only of the speed of rotation of the object 24, but also signals representative of the direction of rotation of the object 24.

The above designations "left" and "right" (also L and R, respectively) are indicative of physical placement of the magnetic field sensors 52a-52c relative to the object 24 and correspond arbitrarily to left and right channels. In the illustrative embodiment, three magnetic field sensing elements 52a-52c are used for differential magnetic field sensing, with the central sensor 52b used in both channels. While three magnetic field sensors 52a-52c are shown, it should be appreciated that two or more magnetic field sensors can be used. For example, in an embodiment using only two magnetic field sensors 52a, 52c, only magnetic field sensor 52a can be coupled to the right channel amplifier 54 and only the magnetic field sensor 54c can be coupled to the left channel amplifier 64.

The magnetic field sensor 50 can also include an output protocol processor 68 coupled to receive the RThreshOut signal 58a and the LThreshOut signal 62a and configured to generate an output signal 68a representative of at least the speed of rotation of the object 24. In some embodiments, the output signal 68a is also representative of the direction of rotation of the object 24.

In some embodiments the output signal 68a is a two state square wave having a frequency proportional to the speed of rotation of the object 24 and a duty cycle (or pulse width) representative of the direction of the rotation of the object 24. In other embodiments, the output signal 28a comprises digital words representative of the speed of rotation of the object 24 and the direction of rotation.

Figure 2:
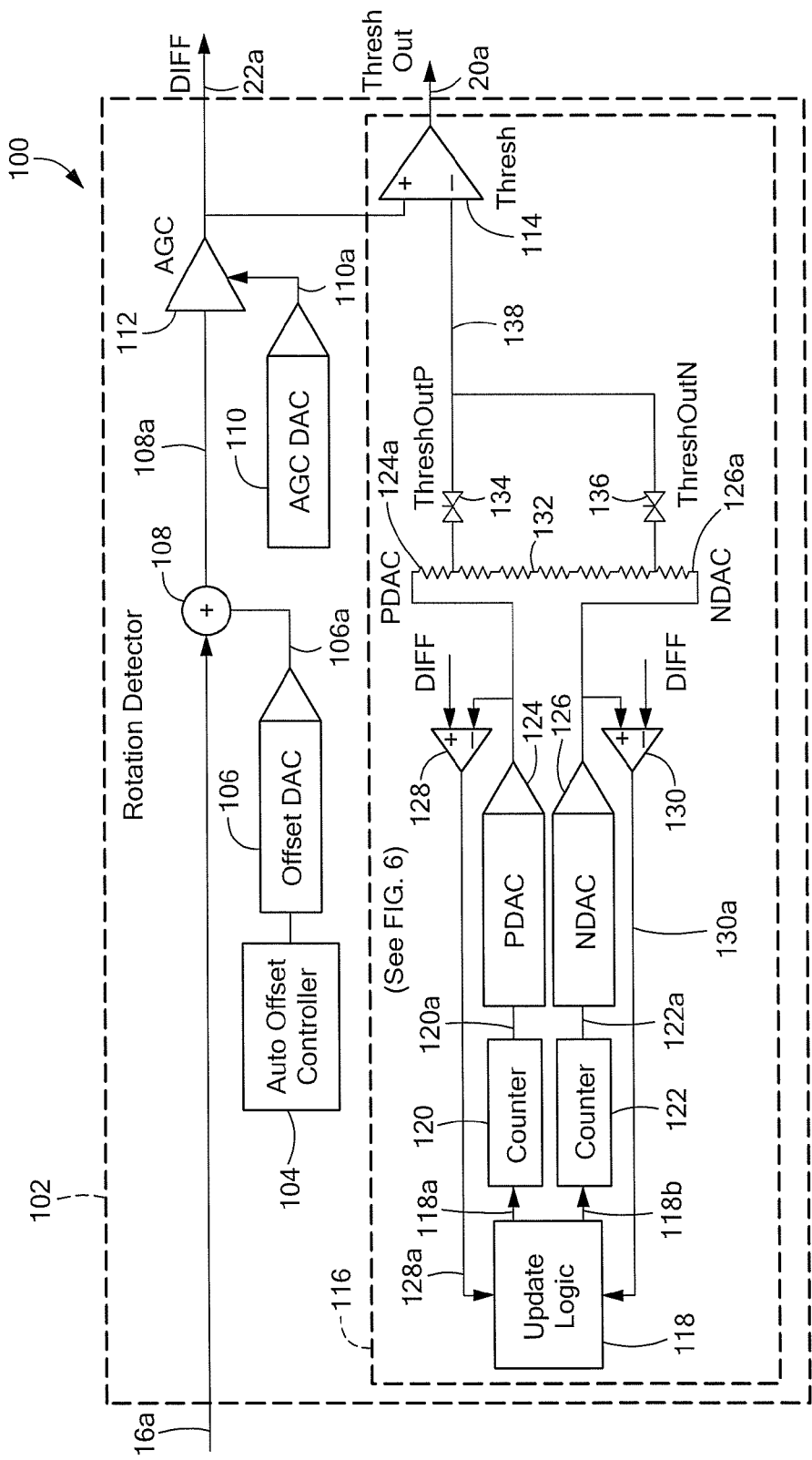
FIG. 2 is a block diagram showing an exemplary rotation detector that can be used as the rotation detector of FIG. 1, having two digital-to-analog converters (DACs), a positive DAC (PDAC) and a negative DAC (NDAC), and having respective update logic associated with the DACs.

Referring now to FIG. 2, in which like elements of FIG. 1 are shown having like reference designations, a circuit 100 includes an exemplary rotation detector 102, which can be the same as or similar to the rotation detector 12 of FIG. 1, but shown in greater detail.

The rotation detector 102 is coupled to receive the magnetic field signal 16a of FIG. 1. The magnetic field signal 16a can include an undesirable DC offset. Therefore, an auto offset controller 104, an offset digital-to-analog converter (DAC) 106, and a summer 108 can be provided in order to eliminate the DC offset.

The rotation detector 102 can also include an automatic gain control (AGC) amplifier 112 coupled to receive an output signal 108a generated by the summer 108 and configured to generate the DIFF signal 22a having an amplitude within a controlled amplitude range. It should be understood that the DIFF signal 22a is representative of the magnetic field experienced by one or more magnetic field sensing elements, for example, the magnetic field sensing element 14 of FIG. 1.

The DIFF signal 22a is coupled to a threshold comparator 114. The threshold comparator 114 also receives a threshold voltage 138. Generation of the threshold voltages 138 is further described below. The threshold comparator 114 is configured to generate the ThreshOut signal 20a.

The threshold voltage 138 can switch between two different values. In one particular embodiment, the threshold voltage 138 can be determined by the above-described threshold detector. A first threshold value can be a first predetermined percentage e.g., eighty-five percent, of a peak-to-peak magnitude of the DIFF signal 22a, e.g., near to but below a positive peak of the DIFF signal 22a. A second threshold value can be a second predetermined percentage, e.g., fifteen percent, of a peak-to-peak magnitude of the DIFF signal 22a, e.g., near to but above a negative peak of the DIFF signal 22a. The threshold voltage 138 can, therefore, be relatively near to and below a positive peak of the DIFF signal 22a at some times and relatively near to and above a negative peak of the DIFF signal 22a at other times. Therefore, the threshold comparator 114 can generate the ThreshOut signal 20a having edges closely associated with the positive and negative peaks of the DIFF signal 22a.

However, in other embodiments, the threshold signal 138 can take on two other different values, for example, two values near to zero crossings of the DIFF signal 22a, and therefore, the threshold comparator 114 can generate the ThreshOut signal 20a having edges closely associated with the zero crossings of the DIFF signal 22a. In still other embodiments, the threshold signal 138 can take on two other different values as may be generated, for example, by a peak-referenced detector, which is described above.

The threshold voltage (or voltages) 138 are generated by a threshold detector 116, which can be the same as or similar to the threshold detector 20 of FIG. 1. The threshold detector 116 can include a PDAC 124 coupled to receive a count signal 120a from a counter 120. The PDAC 124 is configured to generate a PDAC output signal 124a coupled to a first end of a resistor ladder 132. The threshold detector 116 can also include an NDAC 126 coupled to receive a count signal 122a from a counter 122. The NDAC 126 is configured to generate an NDAC output signal 126a coupled to a second end of the resistor ladder 132. The PDAC output signal 124a and the NDAC output signal 126a are also referred to herein as tracking signals.

A first switch 134 is coupled to receive a signal from a first tap in the resistor ladder 132 and a second switch 136 is coupled to receive a signal from a second tap in the resistor ladder 132. The first switch 134 can be controlled by the ThreshOut signal 20a and the second switch 136 can be controlled by an inverted ThreshOut signal 20a, i.e. a ThreshOutN signal.

The threshold detector 116 can also include a first comparator 128 coupled to receive the PDAC signal 124a and also coupled to receive the DIFF signal 22a and configured to generate a first feedback signal 128a. The threshold detector 116 can also include a second comparator 130 coupled to receive the NDAC signal 126a and also coupled to receive the DIFF signal 22a and configured to generate a second feedback signal 130a.

The threshold detector 116 can also include an update logic circuit 118 coupled to receive the first and second feedback signals 128a, 130a, respectively, and configured to generate control signals 118a, 118b to control the counters 120, 122, respectively. Operation of the threshold detector 116, and, in particular, the update logic circuit 118, is further described below in conjunction with FIGS. 6 and 7. Let it suffice here to say that, during a calibration time period (or initialization time period) the threshold detector 116 operates to set the PDAC signal 124a to a positive peak of the DIFF signal 22a and to set the NDAC signal 126a to a negative peak of the DIFF signal 22a. Thus, when the first and second switches 134, 136, respectively, alternately switch, the threshold voltage 138 toggles between two values determined by the resistor divider 132 and by the PDAC and NDAC signals 124a, 126a, respectively.

Figure 2A:
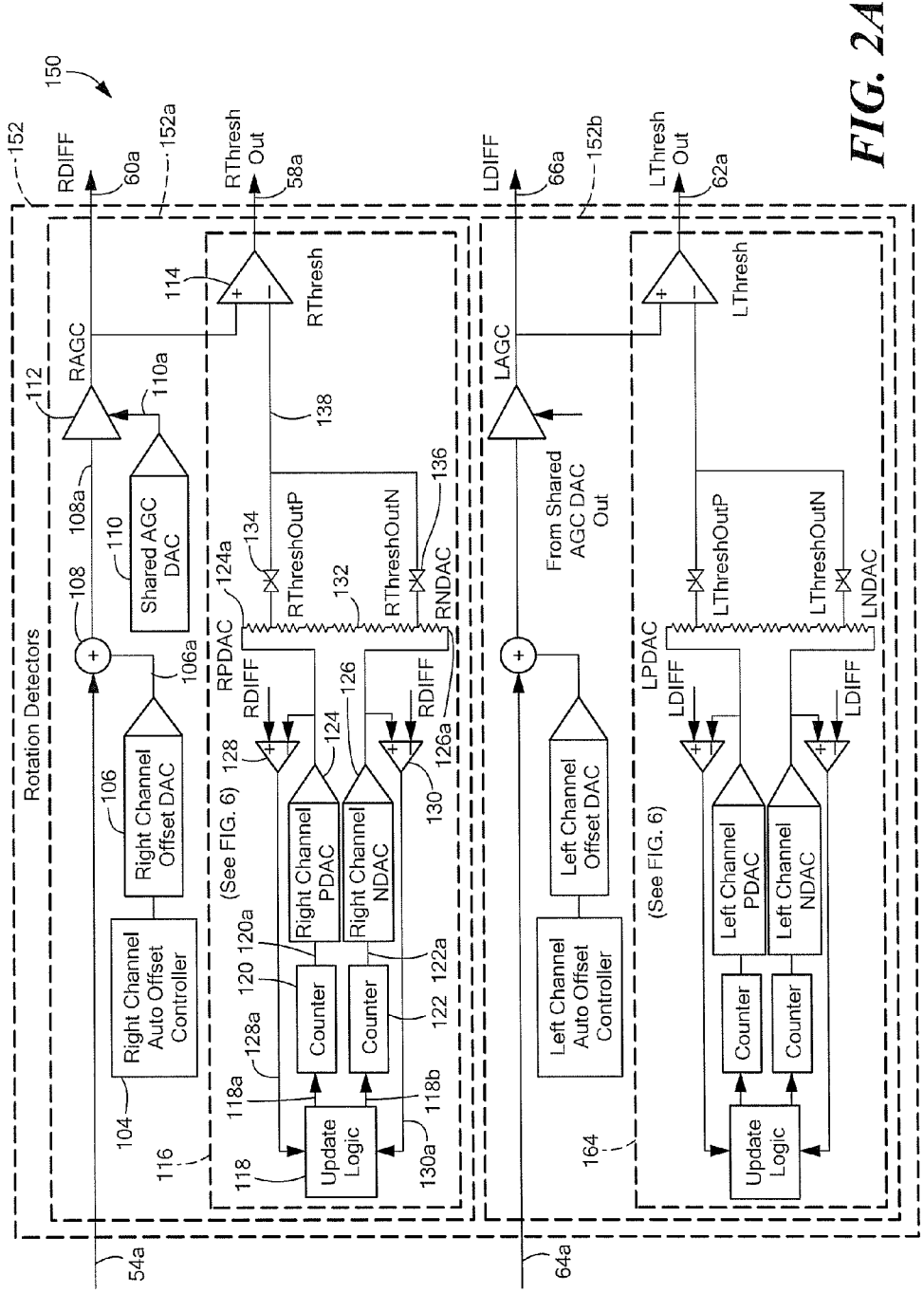
FIG. 2A is a block diagram showing exemplary rotation detectors that can be used as the rotation detectors of FIG. 1A, having two respective PDACs and two respective NDACs and having respective update logic associated with the DACs.

Referring now to FIG. 2A, in which like elements of FIG. 1A are shown having like reference designations, a circuit 150 includes two exemplary rotation detectors 152, identified as 152a, 152b, which can be the same as or similar to the rotation detectors 56a, 56b of FIG. 1A, but shown in greater detail.

The rotation detectors 152 can include two threshold detectors 116, 164, which can be the same as or similar to the threshold detectors 58, 62 of FIG. 1A, but shown in greater detail. The rotation detector 152a is coupled to receive the magnetic field signal 54a of FIG. 1A and the rotation detector 152b is coupled to receive the magnetic field signal 64a of FIG. 1A. The rotation detector 152a is configured to generate the RThreshOut signal 58a (FIG. 1A) and the RDIFF signal 60a (FIG. 1A), and the rotation detector 152b is configured to generate the LThreshOut signal 62a (FIG. 1A) and the LDIFF signal 66a (FIG. 1A).

Operation of each one of the two rotation detectors 152a, 152b is the same as or similar to operation of the rotation detector 102 of FIG. 2, so is not discussed here again.

Figure 3:
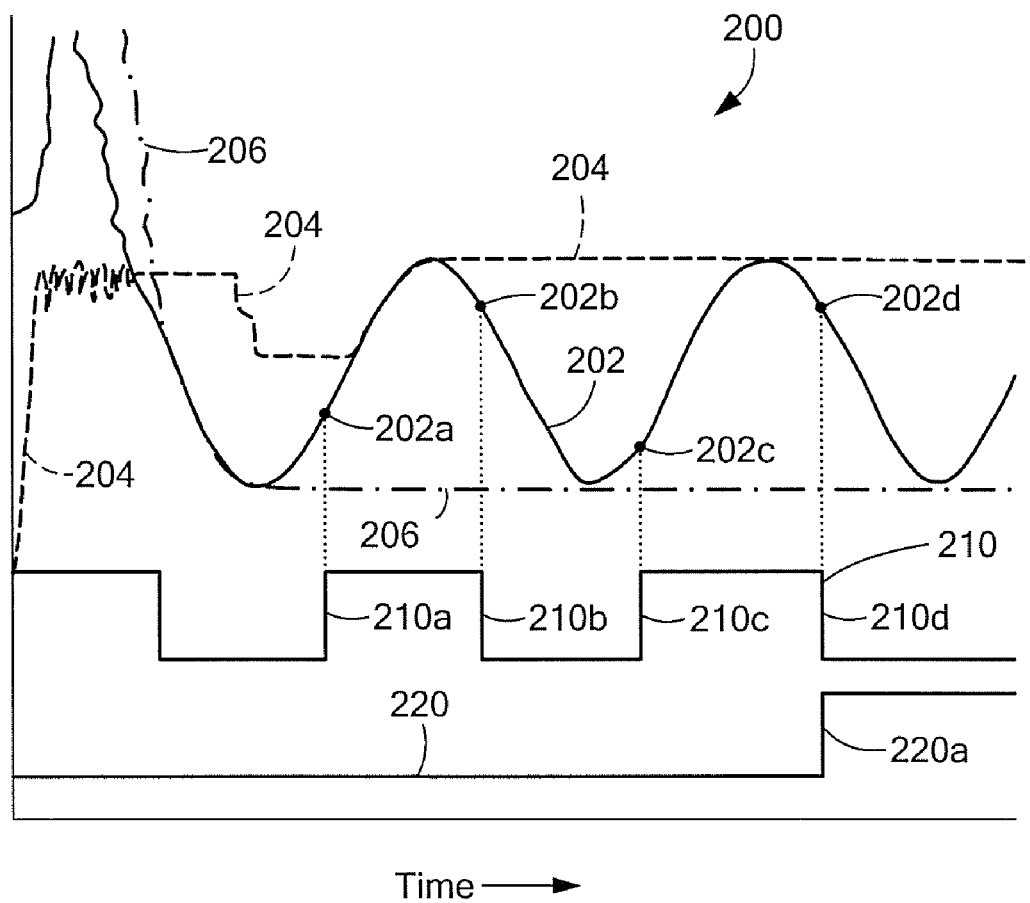
FIG. 3 is a graph showing a calibration region of operation and a running mode region of operation for a relatively slowly moving magnetic field signal experienced by a prior art magnetic field sensor.

Referring now to FIG. 3, a graph 200 has a horizontal axis with a scale in arbitrary units of time and a vertical axis with a scale in arbitrary units of voltage. The graph 200 includes a DIFF signal 202 representative, for example, of the DIFF signal 22a of FIGS. 1 and 2. In normal operation, with a relatively low frequency, i.e., a slowly varying, DIFF signal 202, a PDAC signal 204, which is similar to the PDAC signal 124a of FIG. 2, can reach and acquire positive peaks of the DIFF signal 202 within a small number of cycles of the DIFF signal 202. Similarly, an NDAC signal 206, which is similar to the NDAC signal 126a of FIG. 2, can reach and acquire negative peaks of the DIFF signal 202 within a small number of cycles of the DIFF signal 202.

A ThreshOut signal 210, which is similar to the ThreshOut signal 20a of FIG. 2, has edges 210a-210d that align with points 202a-202d, respectively, of the DIFF signal 202. It will be appreciated that, in some embodiments, the points 202a and 202c can correspond to a predetermined percentage, e.g., fifteen percent, of a peak-to-peak magnitude of the DIFF signal 202, e.g., near to but above a negative peak of the DIFF signal 202, and the points 202b and 202d can correspond to a first predetermined percentage e.g., eighty-five percent, of a peak-to-peak magnitude of the DIFF signal 202, e.g., near to but below a positive peak of the DIFF signal 202

A first threshold value can be a first predetermined percentage e.g., eighty-five percent, of a peak-to-peak magnitude of the DIFF signal 22a, e.g., near to but below a positive peak of the DIFF signal 22a. A second threshold value can be a second predetermined percentage, e.g., fifteen percent, of a peak-to-peak magnitude of the DIFF signal 22a, e.g., near to but above a negative peak of the DIFF signal 22a.

A signal 220 changes state at a time corresponding to an edge 220a, when the calibration is deemed to be successful and adequate in ways described more fully below. Before the edge 220a, the prior art rotation detector is in the initialization or calibration mode, wherein the rotation detector is establishing the PDAC signal 204 and the NDAC signal 206, here at or near the peaks of the DIFF signal 202. After the edge 220a, the prior art rotation detector is in a running mode, in which case the rotation detector 102 is deemed to provide a proper ThreshOut signal 210.

In the prior art, timing of the edge 220a, and therefore, the end of the calibration time period, is determined by counting a predetermined number of cycles of the ThreshOut signal 210, for example, three cycles. For the slowly varying DIFF signal 202, the calibration time period generally is sufficiently long to acquire the positive and negative peaks of the DIFF signal 202.

Figure 4:
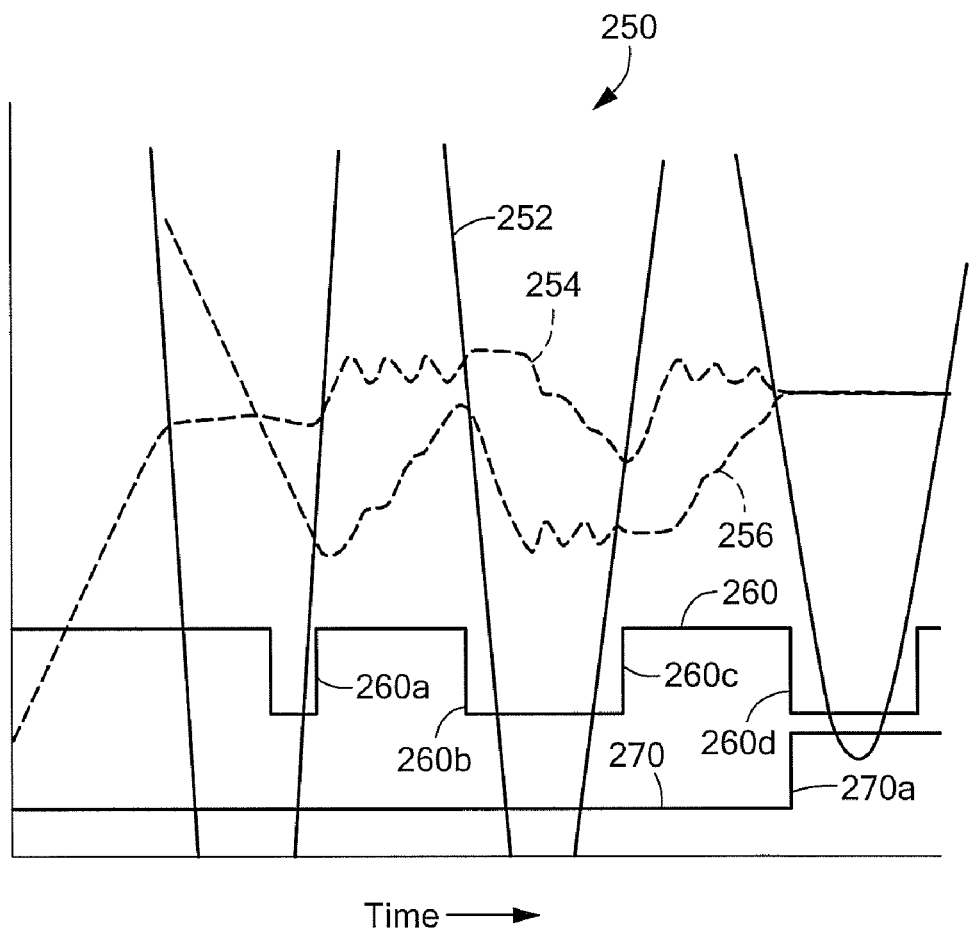
FIG. 4 is a graph showing a calibration region of operation and a running mode region of operation for a relatively quickly moving magnetic field signal experienced by a prior art magnetic field sensor.

Referring now to FIG. 4, a graph 250 has a horizontal axis with a scale in arbitrary units of time and a vertical axis with a scale in arbitrary units of voltage. The graph 250 includes a DIFF signal 252 representative, for example, of the DIFF signal 22a of FIGS. 1 and 2. In normal operation with a relatively high frequency, i.e., a quickly varying, DIFF signal 252, a PDAC signal 254, which is similar to the PDAC signal 124a of FIG. 2, does not have time to reach and acquire positive peaks of the DIFF signal 252 within a small number of cycles of the DIFF signal 252. Similarly, an NDAC signal 256, which is similar to the NDAC signal 126a of FIG. 2, does not have time to reach and acquire negative peaks of the DIFF signal 252 within a small number of cycles of the DIFF signal 252.

A ThreshOut signal 260, which is similar to the ThreshOut signal 20a of FIGS. 1 and 2, has edges 260a-260d. It will be appreciated that, in some embodiments, the edges 260a and 260c can correspond to a predetermined percentage, for example, fifteen percent, by which the DIFF signal 252 is above the NDAC signal 256, and the edges 260b and 260d can correspond to a predetermined percentage, for example, fifteen percent, by which the DIFF signal 252 is below the PDAC signal 254.

A signal 270 changes state at a time corresponding to an edge 270a, when the calibration is deemed to be successful and adequate in ways described more fully below. Before the edge 270a, the prior art rotation detector is in the initialization or calibration mode, wherein the prior art rotation detector is establishing the PDAC signal 254 and the NDAC signal 256.

As described above in conjunction with FIG. 3, in the prior art, timing of the edge 270a, and therefore, the end of the initialization time interval, is determined by counting a predetermined number of cycles of the ThreshOut signal 260, for example, three cycles. For the rapidly varying DIFF signal 252, the resulting amount of time is not sufficient to acquire the positive and negative peaks of the DIFF signal 252 and the ThreshOut signal 260 has edges that are not at desired points near peaks of the DIFF signal 252.

Figure 5:
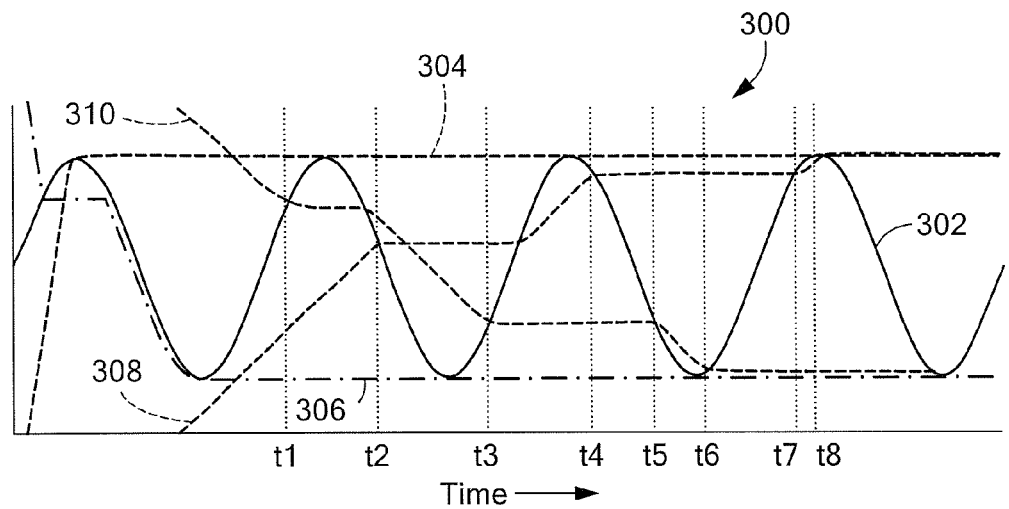
FIG. 5 is a graph showing a calibration region of operation and a running mode region of operation for a relatively slowly moving magnetic field signal and also for a relatively quickly moving magnetic field signal experienced by the magnetic field sensors of FIG. 1 or 1A.

Referring now to FIG. 5, a graph 300 has a horizontal axis with a scale in arbitrary units of time and a vertical axis with a scale in arbitrary units of voltage. The graph 300 includes a DIFF signal 302 representative, for example, of the DIFF signal 22a of FIGS. 1 and 2. In normal operation with a relatively low frequency, i.e., a slowly varying DIFF signal 302, a PDAC signal 304, representative of the PDAC signal 124a of FIGS. 2 and 2A, can reach and acquire positive peaks of the DIFF signal 302 within a small number of cycles of the DIFF signal 302, for example, within one cycle. Similarly, an NDAC signal 306, representative of the NDAC signal 126a of FIGS. 2 and 2A, can reach and acquire negative peaks of the DIFF signal 202 within a small number of cycles of the DIFF signal 302, for example, within one cycle.

Also shown, for a rapidly varying DIFF signal 302, a PDAC signal 308, representative of the PDAC signal 124a of FIGS. 2 and 2A, can reach and acquire positive peaks of the DIFF signal 302 within a larger number of cycles of the DIFF signal 302. Similarly, an NDAC signal 310, representative of the NDAC signal 126a of FIGS. 2 and 2A, can reach and acquire negative peaks of the DIFF signal 302 within a larger number of cycles of the DIFF signal 302.

The PDAC signal 308 attempts to track the DIFF signal 302 between times t0 and t2, t3 and t4, and t7 and t8, eventually achieving a positive peak of the DIFF signal at about time t8. The PDAC signal 308 holds at other times. The NDAC signal 310 attempts to track the DIFF signal 302 between times t0 and t1, t2 and t3, and t5 and t6, eventually achieving a negative peak of the DIFF signal 302 at about time t6. The NDAC signal 310 holds at other times.

Figure 5A:
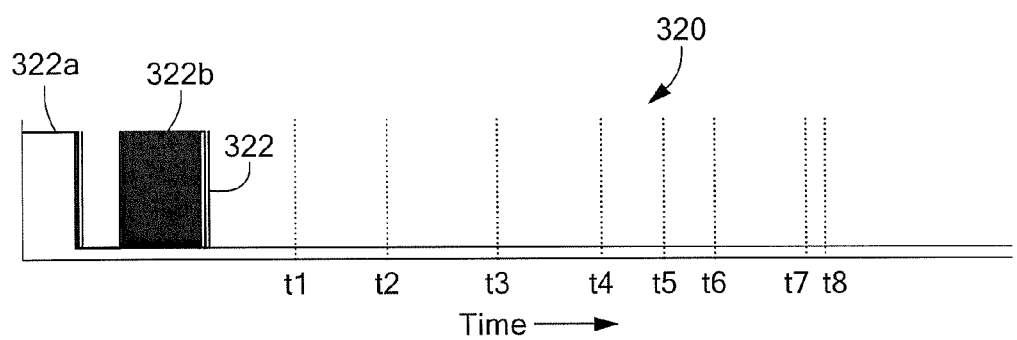
FIG. 5A is a graph showing a signal indicative of updates of a PDAC and an NDAC of FIG. 2 or 2A that is in accordance with a slowly moving magnetic field signal experienced by the magnetic field sensors of FIG. 1 or 1A.

Referring now to FIG. 5A, a graph 320 has a horizontal axis with a scale in arbitrary units of time and a vertical axis with a scale in arbitrary units of voltage. The graph 320 includes a signal 322 having parts 322a and 322b. It will be apparent from discussion below that the signal 322 is representative of a logical combination (OR) of the first and second feedback signals (e.g., 128a, 130a, respectively, of FIG. 2). The signal 322, like the PDAC signal 304 and the NDAC signal 306 of FIG. 5, is representative of a slowly varying DIFF signal 302. The part 322a is representative of times when the PDAC signal 304 is updating, or tracking the DIFF signal 302. The part 322b is representative of times when the NDAC signal 306 is updating, or tracking the DIFF signal 302.

Figure 5B:
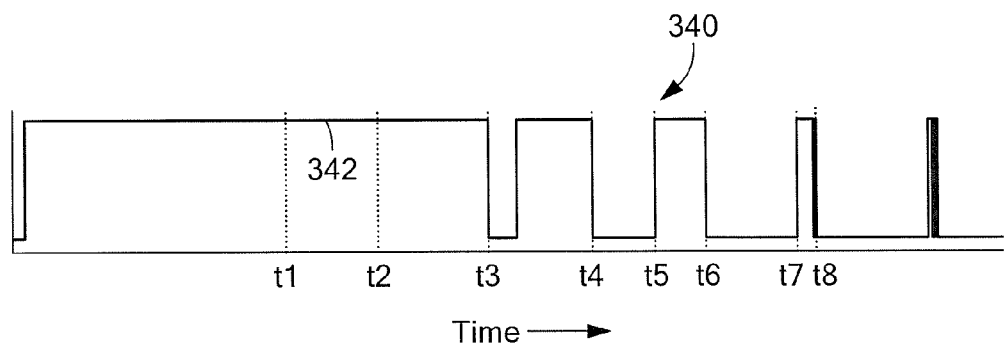
FIG. 5B is a graph showing a signal indicative of updates of a PDAC and an NDAC of FIG. 2 or 2A that is in accordance with a quickly moving magnetic field signal experienced by the magnetic field sensors of FIG. 1 or 1A.

Referring now to FIG. 5B, a graph 340 has a horizontal axis with a scale in arbitrary units of time and a vertical axis with a scale in arbitrary units of voltage. The graph 340 includes a signal 342. It will be apparent from discussion below that the signal 342 is representative of a logical combination (OR) of the first and second feedback signals (e.g., 128a, 130a, respectively, of FIG. 2). The signal 342, like the PDAC signal 308 and the NDAC signal 310 of FIG. 5, is representative of a rapidly varying DIFF signal 302. The signal 342 has high states representative of times when either the PDAC signal 308 or the NDAC signal 310 of FIG. 5 are updating, or tracking the DIFF signal 302.

Comparing FIGS. 5A and 5B, it will be apparent that a time between movements of the DACS (e.g., 124, 126 of FIG. 2) becomes greater as final DAC values are approached, i.e., as the DACS approach the positive and negative peaks.

Figures 6, 6A:
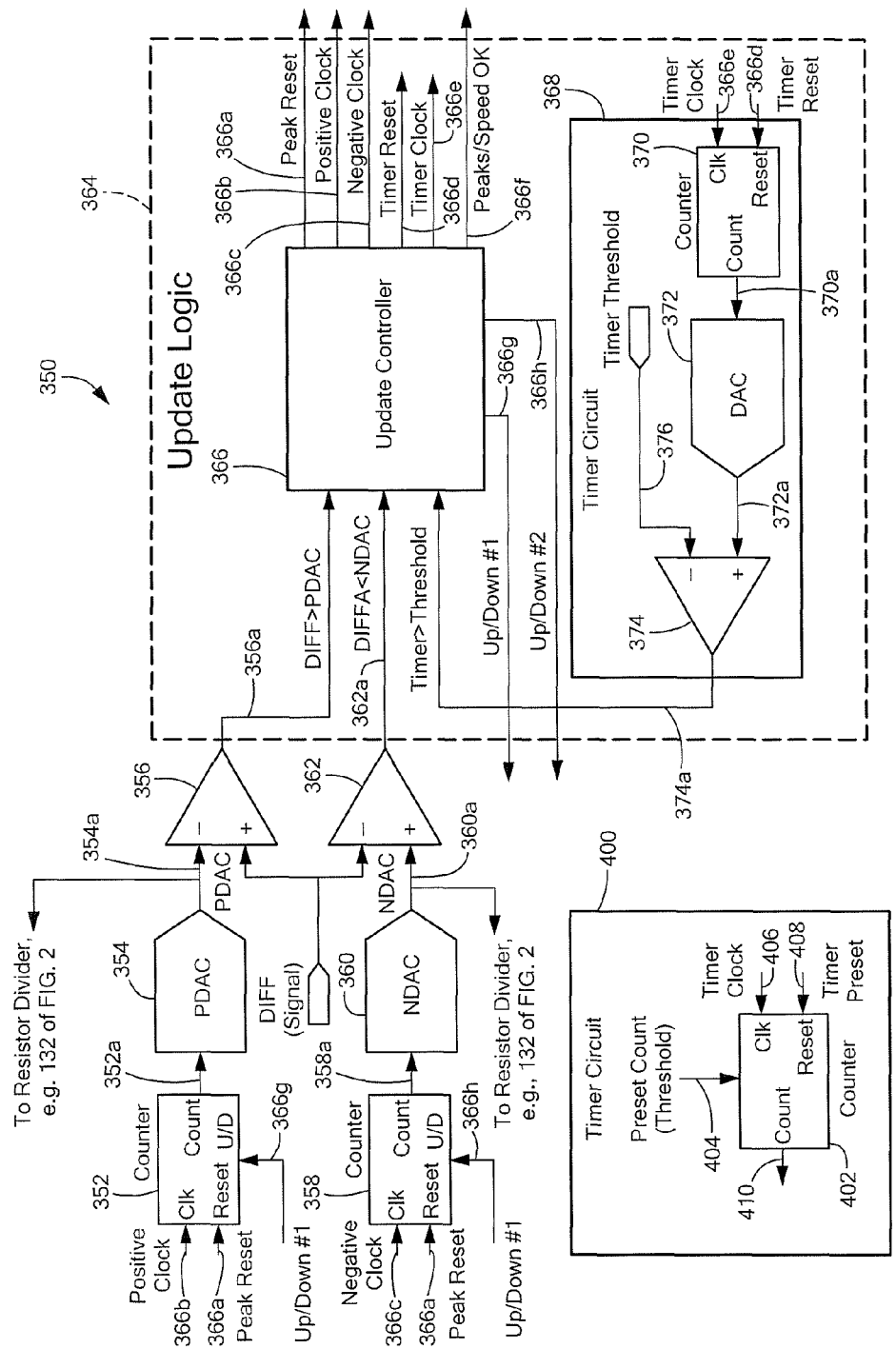
FIG. 6 is a block diagram showing further details of the update logic of FIG. 2 or 2A and having a timer circuit.
FIG. 6A is a block diagram showing an alternate arrangement for the timer circuit of FIG. 6.

Referring now to FIG. 6, a circuit 350 can be the same as or similar to a portion of a threshold detector, for example, a portion of the threshold detector circuit 116 of FIG. 2. The circuit 350 can include an update logic circuit 364 that can be the same as or similar to the update logic circuit 118 of FIG. 2.

The circuit 350 can include a counter 352 configured to generate a counter signal 352a. The counter 352 can be the same as or similar to the counter 120 of FIG. 2. The circuit 350 can include a PDAC 354 coupled to receive the counter signal 352a and configured to generate a PDAC signal 354a. The PDAC 354 can be the same as or similar to the PDAC 124 of FIG. 2.

The circuit 350 can also include a counter 358 configured to generate a counter signal 358a. The counter 358 can be the same as or similar to the counter 122 of FIG. 2. The circuit 350 can include an NDAC 360 coupled to receive the counter signal 358a and configured to generate an NDAC signal 360a. The NDAC 360 can be the same as or similar to the NDAC 126 of FIG. 2.

The circuit 350 can also include a comparator 356 coupled to receive the PDAC signal 354a, coupled to receive a DIFF signal 378, for example the DIFF signal 22a of FIG. 2, and configured to generate a feedback signal 356a. The comparator 356 can be the same as or similar to the comparator 128 of FIG. 2. The circuit 350 can also include a comparator 362 coupled to receive the NDAC signal 360a, coupled to receive the DIFF signal 378, and configured to generate a feedback signal 362a. The comparator 362 can be the same as or similar to the comparator 130 of FIG. 2.

It will be understood that the feedback signal 356a is representative of, i.e., has a state according to, whether the DIFF signal 378 is above or below the PDAC signal 354a. Similarly, the feedback signal 362a is representative of, i.e., has a state according to, whether the DIFF signal 378 is above or below the NDAC signal 360a.

The update logic circuit 364 can include an update controller 366, which, for example, can be in the form of a microprocessor, a programmable gate array (PGA), or any such programmable or non-programmable device. The update controller 366 is coupled to receive the feedback signals 356a, 362a and configured to generate a first signal 366a (peak reset) for resetting the counters 352, 358, a second signal 366b (positive clock) for clocking the counter 352, a third signal 366c (negative clock) for clocking the counter 358, a fourth signal 366d (timer reset) described more fully below, a fifth signal (timer clock) described more fully below, a sixth signal 366f (peaks/speed OK) to indicate if the update logic circuit has successfully calibrated (i.e., if the PDAC 354 and the NDAC 360 have reached and acquired peaks of the DIFF signal 378), a sixth signal 366g (up/down #1) coupled to cause the counter 352 to count up or down, and a seventh signal 366h (up/down #2) coupled to cause the counter 358 to count up or down.

The update logic circuit 364 can include a timer circuit 368. The timer circuit 368 can include a counter 370 coupled to receive the timer clock signal 366e at a clock input and the timer reset signal 366d at a reset input. The counter 370 is configured to generate a count signal 370a. The timer circuit 368 can also include a DAC 372 coupled to receive the count signal 370a and configured to generate a DAC signal 372a. The timer circuit 368 can also include a comparator 374 coupled to receive a timer threshold signal 376, coupled to receive the DAC signal 372a, and configured to generate a signal 374a representative of the timer circuit 368 having timed a predetermined time since the last change of state of the timer reset signal 366d.

The counter 352 can be coupled to receive the positive clock signal 366b at a clock input node, coupled to receive the peak reset signal 366a at a reset node, and coupled to receive the up/down #1 signal 366g at an up/down control node. Similarly, the counter 358 can be coupled to receive the negative clock signal 366c at a clock input node, coupled to receive the peak reset signal 366a at a reset node, and coupled to receive the up/down #2 signal 366h at an up/down control node.

In operation, the update logic circuit, in response to the feedback signals 356a, 362a and in response to the comparison signal 374a, generates the various control signals 366a-366h in order to cause the counters 352, 358 to count at the proper times, causing the PDAC 354 and the NDAC 360 to move toward the positive and negative peaks, respectively, of the DIFF signal 378.

Once the PDAC 354 and the NDAC 360 have reached the positive and negative peaks, respectively, of the DIFF signal 378, the feedback signals 356a, 362a no longer change state as the DIFF signal 378 moves in voltage throughout its cycles. The timer circuit 368 can time a predetermined time interval after the feedback signals 356a, 362a stop changing state, at which time the comparison signal 374a changes state (as will occur when the PDAC output signal 354a reaches a positive peak of the DIFF signal 378 and when the NDAC output signal 360a reaches a negative peak of the DIFF signal 378), indicating to the update controller 366 that the calibration time period has ended. At this time, the sixth signal 366f (peaks/speed OK) can change state, indicating to other circuits that the calibration time period has ended and that the running mode can begin.

It should be understood that the calibration time period ends in the above way, not after a predetermined number of changes of state of the ThreshOut signals 201, 260 of FIGS. 3 and 4, respectively, as described above, but instead after a predetermined time period has elapsed since an end of updates of the PDAC 354 and updates of the NDAC 360. In other words, the timer circuit 368 determines if a first time period since an end of the PDAC update time interval is greater than a predetermined time threshold determined by the counter 370 and determines if a second time period since an end of the NDAC update time interval is greater than the predetermined time threshold. Thus, for either a slowly changing or a quickly changing DIFF signal 378, the portion 350 of the threshold detector circuit has sufficient time to properly acquire the positive and negative peaks of the DIFF signal 378.

In some embodiments, two criteria must be met in order to end the calibration time period. Namely, in some embodiments, the calibration time period ends both after a predetermined number of changes of state of the ThreshOut signals 201, 260 of FIGS. 3 and 4, respectively, and also only after a predetermined time period has elapsed since an end of updates of the PDAC 354 and updates of the NDAC 360. Conceptually, this is because a sufficient number of target features must be observed and enough time must pass for the DACs to observe them.

While one timer circuit 368 is shown, which is responsive to both of the comparison signals 356a and 362a, i.e., to both the PDAC 354 and to the NDAC 360, it should be appreciated that, in other embodiments, there can be two timer circuits, each having a counter, and each of which can have the same timer threshold 376 or different timer thresholds. Therefore, since the circuit 350 can be replicated two times in conjunction with the circuit 152 of FIG. 2A, in some embodiments, there can be up to four timer thresholds. Furthermore, any number of the four timer thresholds can be the same timer threshold.

Referring now to FIG. 6A, a timer circuit 400 can be used in place of the timer circuit 368 of FIG. 6. The timer circuit 400 includes a presetable counter 402, which can be preset to a predetermined count 404. The counter 402 can be coupled to receive a timer clock signal 406 at a clock input and a timer preset signal 408 at a preset input. The counter 370 is configured to generate a count signal 410. The timer clock signal 406 can be the same as or similar to the timer clock signal 366e of FIG. 6, the timer preset signal 408 can be the same as or similar to the timer reset signal 366d of FIG. 6, and the count signal 410 can be the same as or similar to the comparison signal 374a of FIG. 6.

The timer circuit 400 can count down or up from the preset count 404 so as to reach zero, whereupon the count signal 410 changes state. Thus, like the timer circuit 368 of FIG. 6, the timer circuit 400 determines if a first time period since an end of the PDAC update time interval is greater than a predetermined time threshold determined by the counter 402 and determines if a second time period since an end of the NDAC update time interval is greater than the predetermined time threshold.

Figure 7:
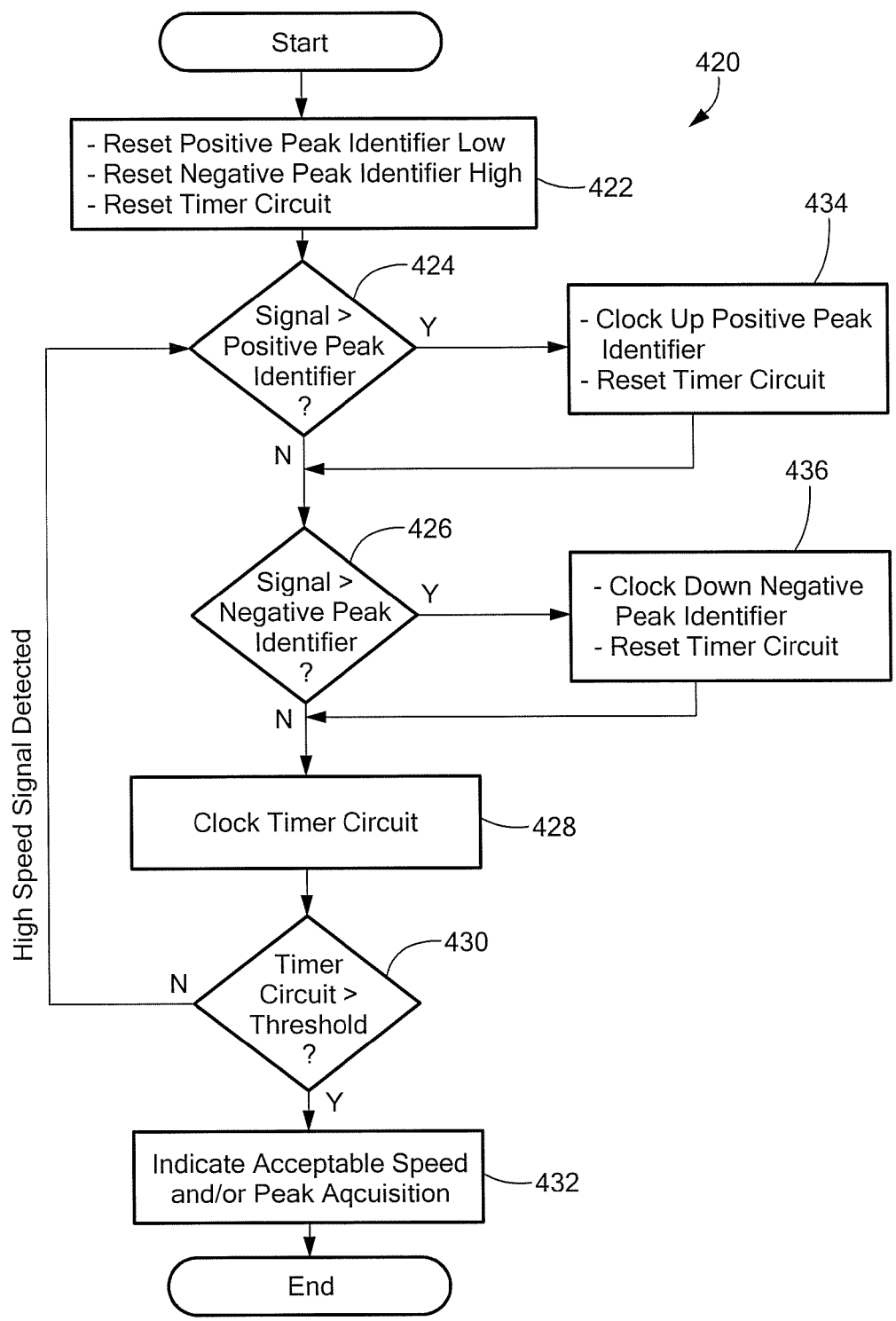
FIG. 7 is a flow chart representative of a process associated with the update logic of FIG. 6.

It should be appreciated that FIG. 7 shows a flowchart corresponding to the below contemplated technique which would be implemented in an update logic circuit (364 FIG. 6). Rectangular elements (typified by element 422 in FIG. 7), herein denoted "processing blocks," represent computer software instructions or groups of instructions. Diamond shaped elements (typified by element 424 in FIG. 7), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 7, an exemplary method 420, begins at block 422, where a positive peak identifier signal, e.g., the PDAC signal 354a of FIG. 6, is set low, a negative peak identifier signal, e.g., the NDAC signal 360a of FIG. 6, is set high, and a timer circuit, e.g., the time r circuit 368 of FIG. 6 is reset.

At block 424, it is detected if a signal, e.g., the DIFF signal 378 of FIG. 6, is above the positive peak identifier signal, e.g., 354a of FIG. 6. At the first pass through the method 420, since the positive peak identifier signal 354a was set low at block 422, the DIFF signal 378 is above the positive peak identifier signal 354a and the process proceeds to block 434.

At block 434, the positive peak identifier (e.g., PDAC 354) is clocked upward a predetermined number of times, typically one time, e.g., the counter 352 of FIG. 6 is clocked, the timer circuit, e.g., the timer circuit 368, is reset, and the process continues to block 426. In other embodiments, the positive peak identifier is clocked more than once.

At block 426, it is detected if the signal, e.g., the DIFF signal 378 of FIG. 6, is below the negative peak identifier signal, e.g., 360a of FIG. 6. At the first pass through the method 420, since the negative peak identifier signal 360a was set high at block 422, the DIFF signal 378 is below the negative peak identifier signal 360a and the process proceeds to block 436.

At block 436, the negative peak identifier (e.g., NDAC 364) is clocked downward a predetermined number of times, typically one time, e.g., the counter 358 of FIG. 6 is clocked, the timer circuit, e.g., the timer circuit 368, is reset, and the process continues to block 428. In other embodiments, the negative peak identifier is clocked more than once.

At block 428, the timer circuit, e.g., the timer circuit 368 of FIG. 6 is clocked a predetermined number of times, e.g., one time.

At block 430, it is determined if the timer circuit, e.g., the timer circuit 368, has reached the timer threshold 378 of FIG. 6. At block 430, on the first pass through the method 420, the timer circuit 368 would not have reached the timer threshold 376 and the process returns to block 424.

At block 424, once the positive peak identifier signal 354a has reached a value such that the DIFF signal never exceeds the positive peak identifier signal 354a, then the process continues directly to block 426. At block 426, once the negative peak identifier signal 360a has reached a value such that the DIFF signal never falls below the negative peak identifier signal 360a, then the process continues to block 428.

Thus, the process stops resetting the timer circuit 368, which would otherwise occur at blocks 434 and 436, but instead continues to clocks the timer circuit 368 each time the process 420 arrives at block 428. Eventually, at block 430, the timer circuit 368 reaches the timer threshold 376 and the process 420 reaches block 432.

At block 432, an indication of an acceptable DIFF signal speed and/or a peak acquisition is given, e.g., by way of a change of state of the peaks/peed OK signal 366f of FIG. 6.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A circuit for detecting a movement of an object, comprising:
    at least one magnetic field sensing element for generating a DIFF signal proportional to a magnetic field associated with the object;
    at least one motion detector coupled to receive the DIFF signal and configured to generate a tracking signal to track the DIFF signal so as to move toward a peak of the DIFF signal, wherein the at least one motion detector comprises:
        a positive digital-to-analog converter (PDAC) configured to generate a PDAC output signal to track the DIFF signal during a PDAC update time interval within a calibration time period and to hold the DIFF signal at times outside of the PDAC update time interval within the calibration time period, wherein the calibration time period is a time period during which at least one aspect of the circuit is calibrated, and wherein the PDAC update time interval is a time interval within the calibration time period during which the PDAC is updated;
    a negative digital-to-analog converter (NDAC) configured to generate an NDAC output signal to track the DIFF signal during an NDAC update time interval within the calibration time period and to hold the DIFF signal at times outside of the NDAC update time interval within the calibration time period, wherein the NDAC update time interval is a time interval within the calibration time period during which the NDAC is updated; and
    an update logic circuit coupled to the PDAC and to the NDAC, wherein the update logic circuit is configured to establish an end of the calibration time period by determining if a first time period since an end of the PDAC update time interval is greater than a first predetermined time threshold and by determining if a second time period since an end of the NDAC update time interval is greater than a second predetermined time threshold.

2. The circuit of claim 1, wherein the first and second predetermined time thresholds are the same predetermined time threshold, and wherein the update logic circuit comprises:
    a timer circuit configured to generate a timer circuit output signal configured to change state in response to both the first time period and the second time period being greater than the predetermined time threshold.

3. The circuit of claim 2, wherein the timer circuit comprises:
    a counter coupled to receive a clock signal and configured to generate a count output signal;
    a DAC coupled to receive the count output signal and configured to generate a DAC output signal; and
    a comparator coupled to receive the DAC output signal, coupled to receive a predetermined threshold signal, and configured to generate the timer circuit output signal having a first state indicative of the DAC output signal being less than the predetermined threshold signal and a second different state indicative of the DAC output signal being greater than the predetermined threshold signal.

4. The circuit of claim 2, wherein the timer circuit comprises:
    a counter coupled to receive a clock signal, coupled to receive a predetermined preset count signal, and configured to generate the timer circuit output signal having a first state indicative of a pulse count of the clock signal being less than the predetermined preset count signal and a second different state indicative of the pulse count of the clock signal being equal to the predetermined preset count signal.

5. The circuit of claim 2, wherein the update logic circuit further comprises:
    an update controller coupled to receive the timer circuit output signal, coupled to receive a first comparison signal indicative of the DIFF signal being above the PDAC output signal, coupled to receive a second comparison signal indicative of the DIFF signal being below the NDAC output signal, and configured to cause the PDAC output signal to track positive-going excursions of the DIFF signal and the NDAC output signal to track negative-going excursions of the DIFF signal in response to states of the timer circuit output signal, the first comparison signal, and the second comparison signal, and configured to cause the PDAC output signal to hold a positive peak signal and the NDAC output signal to hold a negative peak signal in response to other different states of the timer circuit output signal, the first comparison signal, or the second comparison signal.

6. The circuit of claim 1, wherein the at least one magnetic field sensing element comprises at least two magnetic field sensing elements for generating an RDIFF signal and an LDIFF signal, and wherein the at least one motion detector comprises first and second motion detectors, the first motion detector coupled to receive the RDIFF signal and the second motion detector coupled to receive the LDIFF signal.

7. The circuit of claim 6, wherein first motion detector and the second motion detector are configured to generate tracking signals to track the RDIFF signal and the LDIFF signal, respectively, wherein the first motion detector comprises:
    a first PDAC configured to generate a first PDAC output signal to track the RDIFF signal during a first PDAC update time interval within a first calibration time period and to hold the RDIFF signal at times outside of the first PDAC update time interval within the first calibration time period;
a first NDAC configured to generate a first NDAC output signal to track the RDIFF signal during a first NDAC update time interval within the first calibration time period and to hold the RDIFF signal at times outside of the first NDAC update time interval within the first calibration time period; and
a first update logic circuit coupled to the first PDAC and to the first NDAC, wherein the first update logic circuit is configured to establish an end of the first calibration time period by determining if a first time period since an end of the first PDAC update time interval is greater than a first predetermined time threshold and by determining if a second time period since an end of the first NDAC update time interval is greater than a second predetermined time threshold, and wherein the second motion detector comprises:
a second PDAC configured to generate a second PDAC output signal to track the LDIFF signal during a second PDAC update time interval within a second calibration time period and to hold the LDIFF signal at times outside of the second PDAC update time interval within the second calibration time period;
a second NDAC configured to generate a second NDAC output signal to track the LDIFF signal during a second NDAC update time interval within the second calibration time period and to hold the LDIFF signal at times outside of the second NDAC update time interval within the second calibration time period; and
a second update logic circuit coupled to the second PDAC and to the second NDAC, wherein the second update logic circuit is configured to establish an end of the second calibration time period by determining if a third time period since an end of the second PDAC update time interval is greater than a third predetermined time threshold and by determining if a fourth time period since an end of the second NDAC update time interval is greater than a fourth predetermined time threshold.

8. The circuit of claim 7, wherein the first and second predetermined time thresholds are the same first calibration time threshold and wherein the third and fourth predetermined time thresholds are the same second calibration time threshold, wherein the first update logic circuit comprises:
a first timer circuit configured to generate a first timer circuit output signal configured to change state in response to both the first time period and the second time period being greater than the first calibration time threshold, and wherein the second update logic circuit comprises:
a second timer circuit configured to generate a second timer circuit output signal configured to change state in response to both the third time period and the fourth time period being greater than the second calibration time threshold.

9. The circuit of claim 8, wherein the first and second timer circuits each comprise:
a respective counter coupled to receive a respective clock signal and configured to generate a respective count output signal;
a respective DAC coupled to receive the respective count output signal and configured to generate a respective DAC output signal; and
a respective comparator coupled to receive the respective DAC output signal, coupled to receive a respective predetermined threshold signal, and configured to generate the first or second timer circuit output signal, respectively, each timer circuit output signal having a first state indicative of the respective DAC output signal being less than the respective predetermined threshold signal and a second different state indicative of the respective DAC output signal being greater than the respective predetermined threshold signal.

10. The circuit of claim 8, wherein the first and second timer circuits each comprise:
a respective counter coupled to receive a respective clock signal, coupled to receive a respective predetermined preset count signal, and configured to generate the first or second timer circuit output signal respectively, each timer circuit output signal having a first state indicative of a pulse count of the respective clock signal being less than the respective predetermined preset count signal and a second different state indicative of the pulse count of the respective clock signal being equal to the respective predetermined preset count signal.

11. The circuit of claim 8, wherein the first update logic circuit further comprises:
a first update controller coupled to receive the first timer circuit output signal, coupled to receive a first comparison signal indicative of the RDIFF signal being above the first PDAC output signal, coupled to receive a second comparison signal indicative of the RDIFF signal being below the first NDAC output signal, and configured to cause the first PDAC output signal to track positive-going excursions of the RDIFF signal and the first NDAC output signal to track negative-going excursions of the RDIFF signal in response to states of the first timer output signal, the first comparison signal, and the second comparison signal, and configured to cause the first PDAC output signal to hold a first positive peak signal and the first NDAC output signal to hold a first negative peak signal in response to other different states of the first timer output signal, the first comparison signal, or the second comparison signal, and wherein the second update logic circuit further comprises:
a second update controller coupled to receive the second timer circuit output signal, coupled to receive a third comparison signal indicative of the LDIFF signal being above the second PDAC output signal, coupled to receive a fourth comparison signal indicative of the LDIFF signal being below the second NDAC output signal, and configured to cause the second PDAC output signal to track positive-going excursions of the LDIFF signal and the second NDAC output signal to track negative-going excursions of the LDIFF signal in response to states of the second timer circuit output signal, the third comparison signal, and the fourth comparison signal, and configured to cause the second PDAC output signal to hold a second positive peak signal and the second NDAC output signal to hold a second positive peak signal in response to other different states of the second timer circuit output signal, the third comparison signal, or the fourth comparison signal.

12. A method, used in a magnetic field sensor, of detecting a movement of an object, comprising:
generating a DIFF signal with at least one magnetic field sensing element, wherein the DIFF signal is proportional to a magnetic field associated with the object;
generating a tracking signal to track the DIFF signal, wherein the generating the tracking signal comprises:
generating a positive digital-to-analog converter (PDAC) output signal to track the DIFF signal during a PDAC update time interval within a calibration time period and to hold the DIFF signal at times outside of the PDAC update time interval within the calibration time period, wherein the calibration time period is a time period during which at least one aspect of the magnetic field sensor is calibrated, and wherein the update time interval is a time interval within the calibration time period during which the PDAC is updated;

generating a negative digital-to-analog converter (NDAC) output signal to track the DIFF signal during an NDAC update time interval within the calibration time period and to hold the DIFF signal at times outside of the NDAC update time interval within the calibration time period, wherein the NDAC update time interval is a time interval within the calibration time period during which the NDAC is updated; and establishing an end of the calibration time period, wherein the establishing comprises:
determining if a first time period since an end of the PDAC update time interval is greater than a first predetermined time threshold; and
determining if a second time period since an end of the NDAC update time interval is greater than a second predetermined time threshold.

13. The method of claim 12, wherein the first and second predetermined time thresholds are the same predetermined time threshold, and wherein the establishing comprises:
generating a timer circuit output signal configured to change state in response to both the first time period and the second time period being greater than the predetermined time threshold.

14. The method of claim 13, wherein the generating the timer circuit output signal comprises:
generating a count output signal;
generating a DAC output signal in response to the count output signal; and
generating, in response to the DAC output signal, the timer circuit output signal having a first state indicative of the DAC output signal being less than a predetermined threshold signal and a second different state indicative of the DAC output signal being greater than the predetermined threshold signal.

15. The method of claim 13, wherein the generating the timer circuit output signal comprises:
predetermining a preset count signal;
generating a clock signal; and
generating, in response to the predetermined preset count signal, the timer circuit output signal having a first state indicative of a pulse count of the clock signal being less than the predetermined preset count signal and a second different state indicative of the pulse count of the clock signal being equal to the predetermined preset count signal.

16. The method of claim 13, wherein the establishing further comprises:
generating a first comparison signal indicative of the DIFF signal being above the PDAC output signal;
generating a second comparison signal indicative of the DIFF signal being below the NDAC output signal;
causing the PDAC output signal to track positive-going excursions of the DIFF signal and the NDAC output signal to track negative-going excursions of the DIFF signal in response to states of the timer circuit output signal, the first comparison signal, and the second comparison signal; and
causing the PDAC output signal to hold a positive peak signal and the NDAC output signal to hold a negative peak signal in response to other different states of the timer circuit output signal, the first comparison signal, or the second comparison signal.

17. The method of claim 12, wherein the at least one magnetic field sensing element comprises at least two magnetic field sensing elements for generating an RDIFF signal and an LDIFF signal, and wherein the generating the tracking signal comprises generating first and second tracking signals, respectively.

18. The method of claim 17, wherein the generating the first tracking signal comprises:
generating a first PDAC output signal to track the RDIFF signal during a first PDAC update time interval within a first calibration time period and to hold the RDIFF signal at times outside of the first PDAC update time interval within the first calibration time period;
generating a first NDAC output signal to track the RDIFF signal during a first NDAC update time interval within the first calibration time period, wherein, after the first calibration time period and to hold the RDIFF signal at times outside of the first NDAC update time interval within the first calibration time period; and
establishing an end of the first calibration time period, wherein the establishing comprises:
determining if a first time period since an end of the first PDAC update time interval is greater than a first predetermined time threshold; and
determining if a second time period since an end of the first NDAC update time interval is greater than a second predetermined time threshold, and
wherein the generating the second tracking signal comprises:
generating a second PDAC output signal to track the LDIFF signal during a second PDAC update time interval within a second calibration time period and to hold the LDIFF signal at times outside of the second PDAC update time interval within the second calibration time period;
generating a second NDAC output signal to track the LDIFF signal during a second NDAC update time interval within the second calibration time period, wherein, after the second calibration time period and to hold the LDIFF signal at times outside of the second NDAC update time interval within the second calibration time period; and
establishing an end of the second calibration time period, wherein the establishing comprises:
determining if a third time period since an end of the second PDAC update time interval is greater than a third predetermined time threshold; and
determining if a fourth time period since an end of the second NDAC update time interval is greater than a fourth predetermined time threshold.

19. The method of claim 18, wherein the first and second predetermined time thresholds are the same first calibration time threshold and wherein the third and fourth predetermined time thresholds are the same second calibration time threshold, wherein the establishing the first calibration time period comprises:
generating a first timer circuit output signal configured to change state in response to both the first time period and the second time period being greater than the first calibration time threshold, and wherein the establishing the second calibration time period comprises:
generating a second timer circuit output signal configured to change state in response to both the third time period and the fourth time period being greater than the second calibration time threshold.

20. The method of claim 19, wherein the generating the first timer circuit output signal and the generating the second timer circuit output signal each comprise:
  generating a respective count output signal;
  generating a respective DAC output signal in response to the respective count output signal; and
  generating the first or second timer circuit output signal, respectively, each timer circuit output signal having a first state indicative of the respective DAC output signal being less than a respective predetermined threshold signal and a second different state indicative of the respective DAC output signal being greater than the respective predetermined threshold signal.

21. The method of claim 19, wherein the generating the first timer circuit output signal and the generating the second timer circuit output signal each comprise:
  predetermining a respective preset count signal; and
  generating, in response to the respective preset count signal, the first or second timer circuit output signals, respectively, having a first state indicative of a pulse count of a respective clock signal being less than the respective predetermined preset count signal and a second different state indicative of the pulse count of the respective clock signal being equal to the respective predetermined preset count signal.

22. The method of claim 19, wherein the establishing the first calibration time period comprises:
  receiving a first comparison signal indicative of the RDIFF signal being above the first PDAC output signal;
  receiving a second comparison signal indicative of the RDIFF signal being below the first NDAC output signal;
  causing the first PDAC output signal to track positive-going excursions of the RDIFF signal and the first NDAC output signal to track negative-going excursions of the RDIFF signal in response to states of the first timer output signal, the first comparison signal, and the second comparison signal; and
  causing the first PDAC output signal to hold a first positive peak signal and the first NDAC output signal to hold a first negative peak signal in response to other different states of the first timer output signal, the first comparison signal, or the second comparison signal, and wherein the establishing the second calibration time period comprises:
  receiving a third comparison signal indicative of the LDIFF signal being above the second PDAC output signal;
  receiving a fourth comparison signal indicative of the LDIFF signal being below the second NDAC output signal;
  causing the second PDAC output signal to track positive-going excursions of the LDIFF signal and the second NDAC output signal to track negative-going excursions of the LDIFF signal in response to states of the second timer circuit output signal, the third comparison signal, and the fourth comparison signal; and
  causing the second PDAC output signal to hold a second positive peak signal and the second NDAC output signal to hold a second negative peak signal in response to other different states of the second timer circuit output signal, the third comparison signal, or the fourth comparison signal.

23. A method, used in a magnetic field sensor, of detecting movement of an object, comprising:
  generating a magnetic field signal with at least one magnetic field sensing element, wherein the magnetic field signal is proportional to a magnetic field associated with the object;
  generating a tracking signal during a calibration mode of operation that moves toward a peak of the magnetic field signal at least until the peak is reached, wherein the calibration mode occurs during a calibration time period during which at least one as aspect of the magnetic field sensor is calibrated; and
  terminating the calibration mode of operation after a predetermined time interval has lapsed since the tracking signal reached the peak of the magnetic field signal.

24. The method of claim 23, wherein terminating comprises:
  generating, with a first DAC, a first DAC output signal configured to track the magnetic field signal during a first DAC update time interval;
  generating, with a second DAC, a second DAC output signal configured to track the magnetic field signal during a second DAC update time interval;
  determining if a first time period since an end of the first DAC update time interval is greater than a first predetermined time threshold;
  determining if a second time period since an end of the second DAC update time interval is greater than a second predetermined time threshold; and
  terminating the calibration mode of operation after a predetermined time interval has lapsed since the end of the first DAC update time interval or since an end of the second DAC update time interval.

25. The method of claim 24, wherein the first DAC is configured to hold positive peaks of the magnetic field signal and wherein the second DAC is configured to hold negative peaks of the magnetic field signal.

* * * * *

UNITED STATES PATENT AND TRADEMARK OFFICE
CERTIFICATE OF CORRECTION

| | | |
|---|---|---|
| PATENT NO. | : 8,299,783 B2 | Page 1 of 1 |
| APPLICATION NO. | : 12/548738 | |
| DATED | : October 30, 2012 | |
| INVENTOR(S) | : Devon Fernandez et al. | |

It is certified that error appears in the above-identified patent and that said Letters Patent is hereby corrected as shown below:

In the Specification

Column 1, line 60 delete "Pat." and replace with --Patent--.

Column 2, line 19 delete "Pat." and replace with --Patent--.

Column 2, line 47 delete "field signals" and replace with --field signals.--.

Column 4, line 23 delete "FIG. 2 or 2A" and replace with --FIGS. 2 or 2A;--.

Column 5, line 26 delete "Pat." and replace with --Patent--.

Column 5, line 27 delete "U.S. patent application Ser. No." and replace with --U.S. Patent Application No.--.

Column 6, line 31 delete "14a, 14a" and replace with --14a,14b--.

Column 6, line 49 delete "53bb" and replace with --52bb--.

Column 9, line 63 delete "signal 202" and replace with --signal 202.--.

Column 14, line 41 delete "time r" and replace with --timer--.

Column 15, line 24 delete "peak/peed" and replace with --peak/speed--.

Signed and Sealed this
Eleventh Day of August, 2015

Michelle K. Lee
*Director of the United States Patent and Trademark Office*